United States Patent [19]
Lan

[11] Patent Number: 5,864,983
[45] Date of Patent: Feb. 2, 1999

[54] FLYTRAP

[76] Inventor: Tang-Min Lan, Ta Chu Wei, No. 225-2, Hung-Chu Tsun, Lu-Chu Hsiang, Tao-Yuan Hsien, Taiwan

[21] Appl. No.: 782,094

[22] Filed: Jan. 13, 1997

[51] Int. Cl.⁶ ..................................... A01M 1/10
[52] U.S. Cl. ............................... 43/107; 43/111
[58] Field of Search ............... 43/81, 107, 124, 43/132.1, 111, 137, 72, 73, 74, 121

[56] References Cited

U.S. PATENT DOCUMENTS

| 988,146 | 3/1911 | Sayles | 43/111 |
|---|---|---|---|
| 1,277,298 | 8/1918 | Dreilick | 43/111 |
| 3,292,299 | 12/1966 | Mettler | 43/137 X |
| 4,103,449 | 8/1978 | Vasquez | 43/111 |

*Primary Examiner*—Joseph J. Hail, III
*Assistant Examiner*—Anthony Ojini
*Attorney, Agent, or Firm*—Bacon & Thomas

[57] ABSTRACT

A flytrap including a casing having a trapping area adapted for holding a bait for attracting flies, a flapping mechanism, a holding-down mechanism, and an intermittent action control device, wherein when the driving mechanism is turned on, the holding-down mechanism is moved by a driven member of the driving mechanism to hold down the flapping mechanism, and the intermittent action control device starts counting a predetermined length of time when the driven member is turned to switch off a power control switch in cutting off power supply from the driving mechanism, and the driving mechanism is started again when the counting is ended, causing the the holding-down mechanism to be released from the flapping mechanism, permitting the flapping mechanism to flap attracted flies with a flyflap.

12 Claims, 5 Drawing Sheets

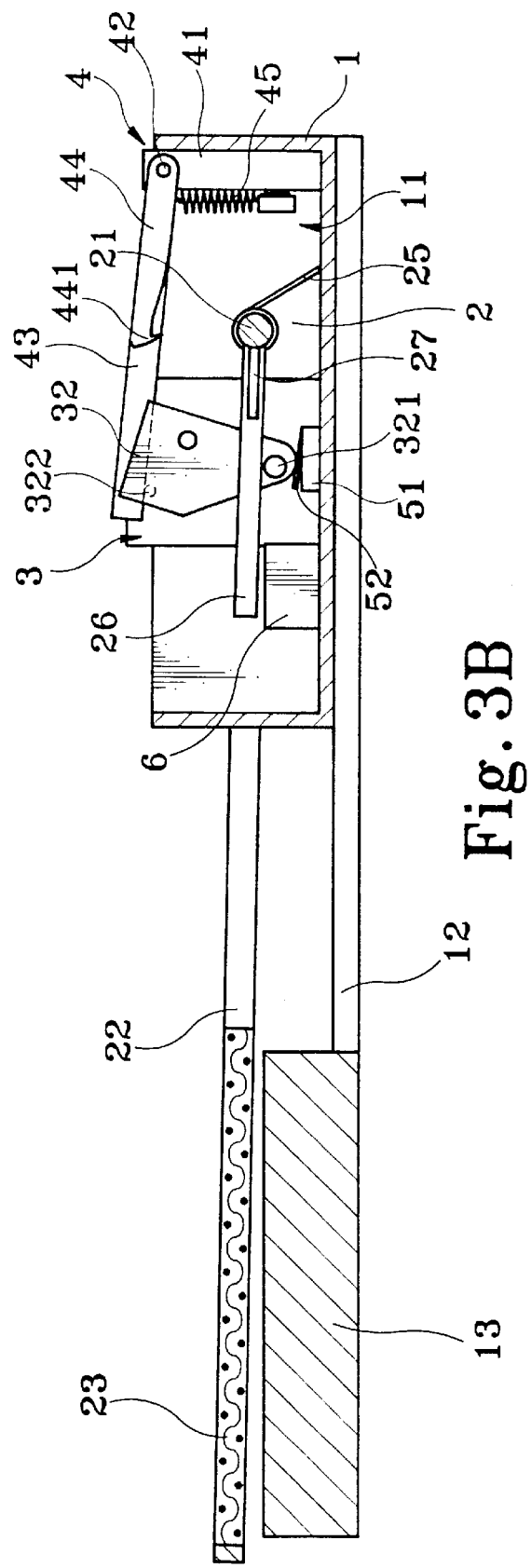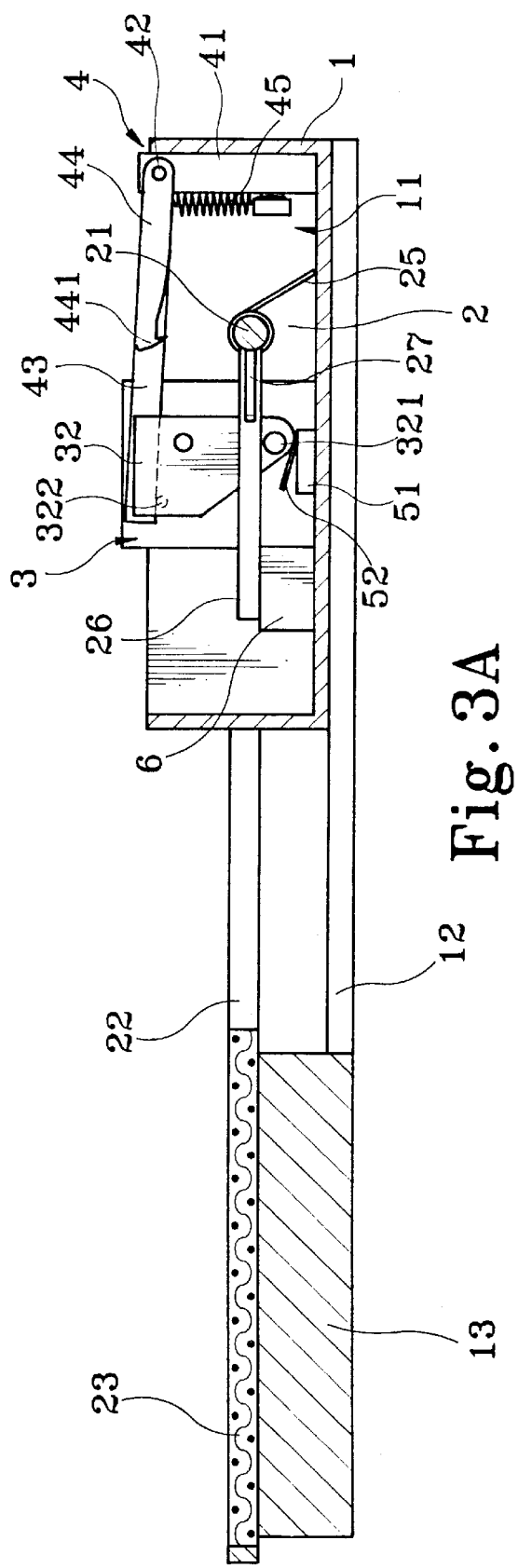

FLYTRAP

BACKGROUND OF THE INVENTION

The present invention relates to flytraps, and more particularly to such a flytrap which intermittently drives a flyflap to flap flies attracted by a bait.

When catching or killing flies, a flypaper or flyflap may be used. When killing flies with a flyflap, dead flies may be left in food, causing food to be contaminated. A flypaper is a paper coated with some sticky or poisonous substance for catching flies. However, because of its limited area, a flypaper can only catch a limited number of flies. There is known a device comprised of a swinging rod having tassels hung thereon and a motor drive controlled to turn the swinging rod, and used for flapping flies away. However, this device can only flap flies away, but cannot kill flies.

SUMMARY OF THE INVENTION

It is one object of the present invention to provide a flytrap which comprises a flapping mechanism controlled to intermittently flap flies. It is another object of the present invention to provide a flytrap which uses a motor drive to turn a flapping mechanism in flapping flies. It is still another object of the present invention to provide a flytrap which uses a bait to attract flies so that attracted flies can be killed by a flapping mechanism. It is still another object of the present invention to provide a flytrap which uses a timer to control the operation of the motor drive in driving the flyflap of the flapping mechanism.

BRIEF DESCRIPTION OF THE DRAWINGS

FIG. 3A is a sectional view taken along line III—III of FIG. 2;

FIG. 3B is similar to FIG. 3A but showing the flyflap lifted (Step I);

DETAILED DESCRIPTION OF THE PREFERRED EMBODIMENT

Figure 1:
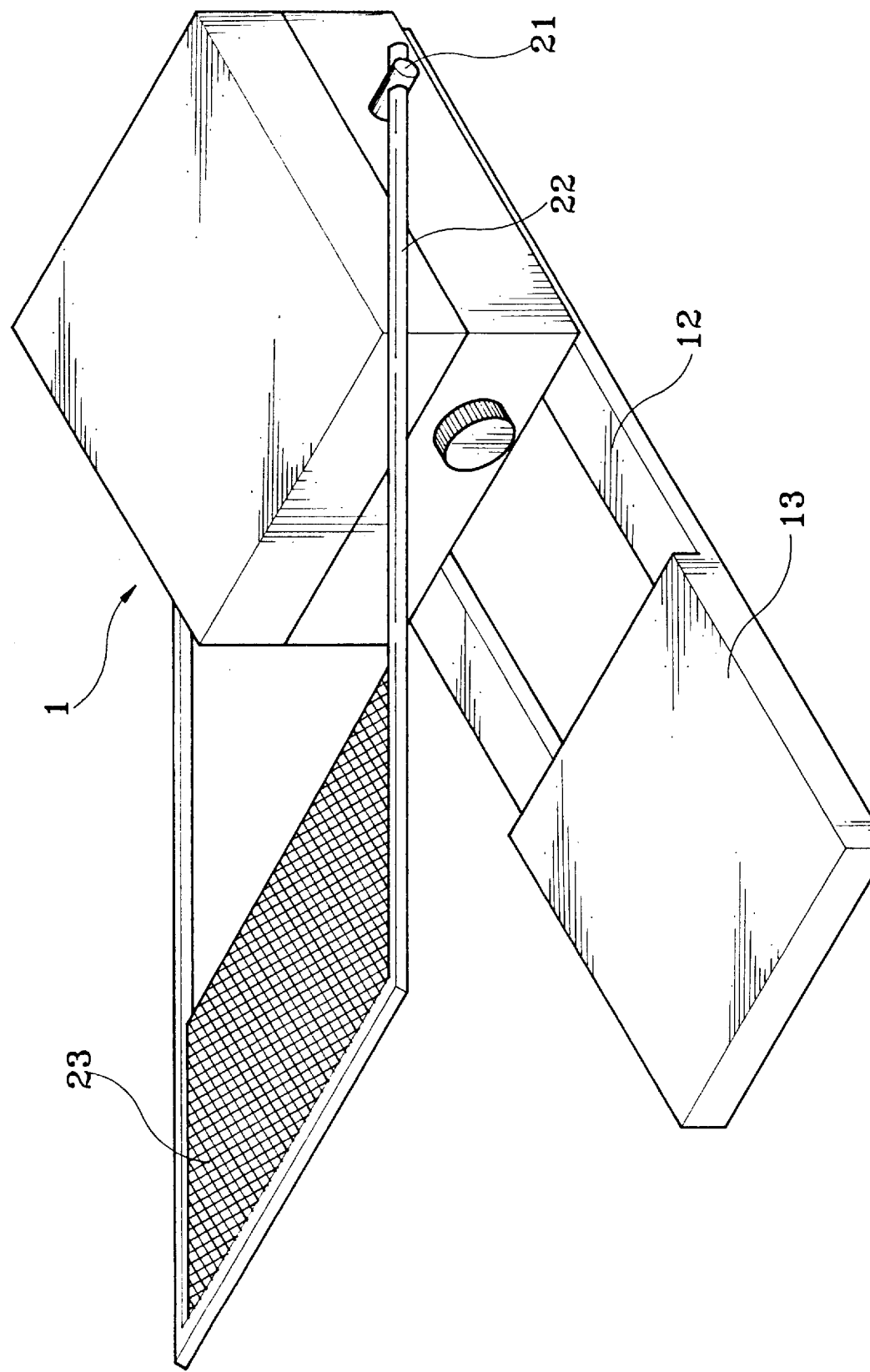
FIG. 1 is a perspective view of a flytrap according to the present invention.
Figure 2:
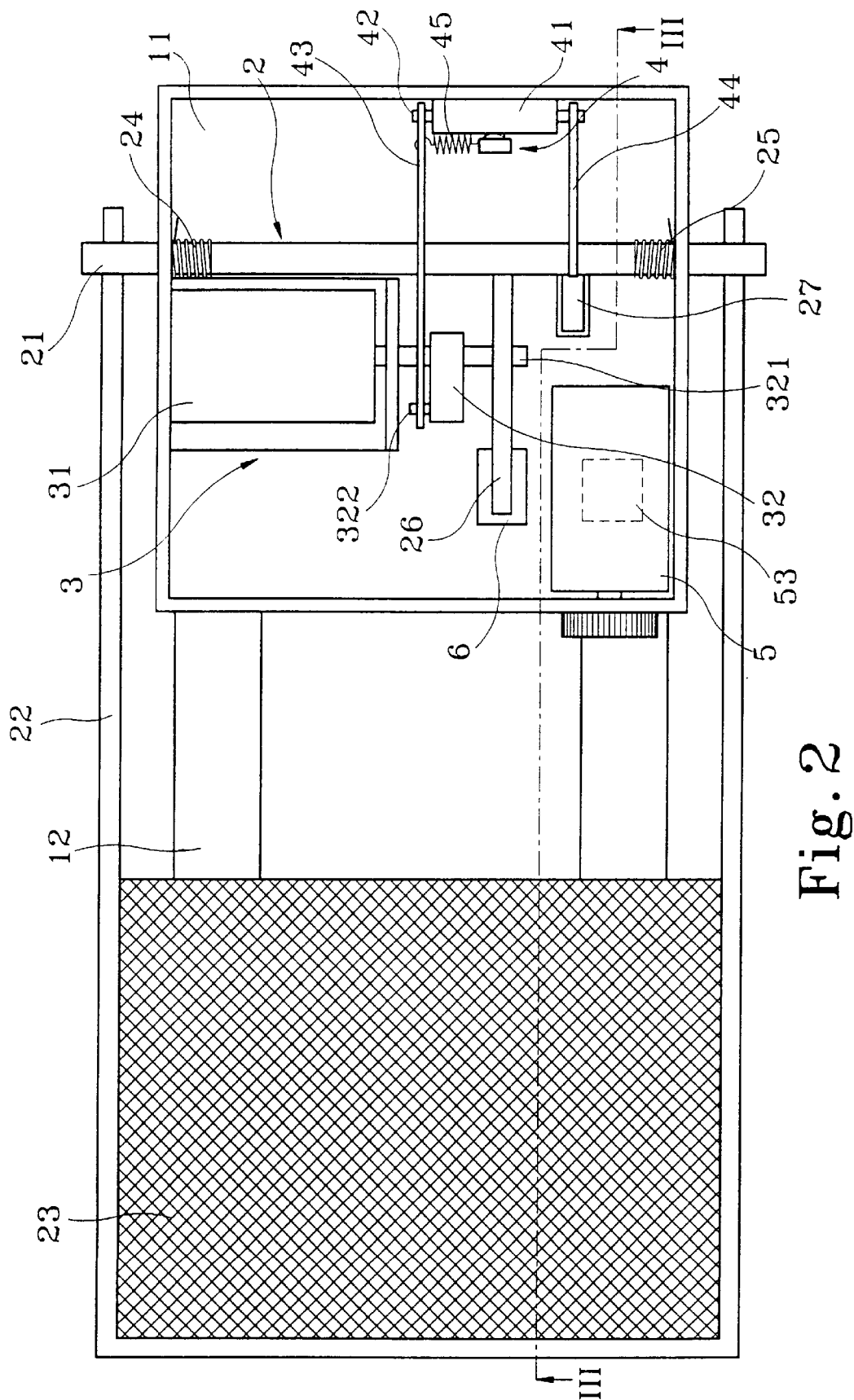
FIG. 2 is a top plan view of the flytrap shown in FIG. 1.

Referring to FIGS. 1 and 2, a flytrap is controlled to flap flies at a predetermined time interval, comprised of a casing 1, a flapping mechanism 2, a driving mechanism 3, a holding-down mechanism 4, an intermittent action control device 5, and a stop device 6.

Figure 3C:
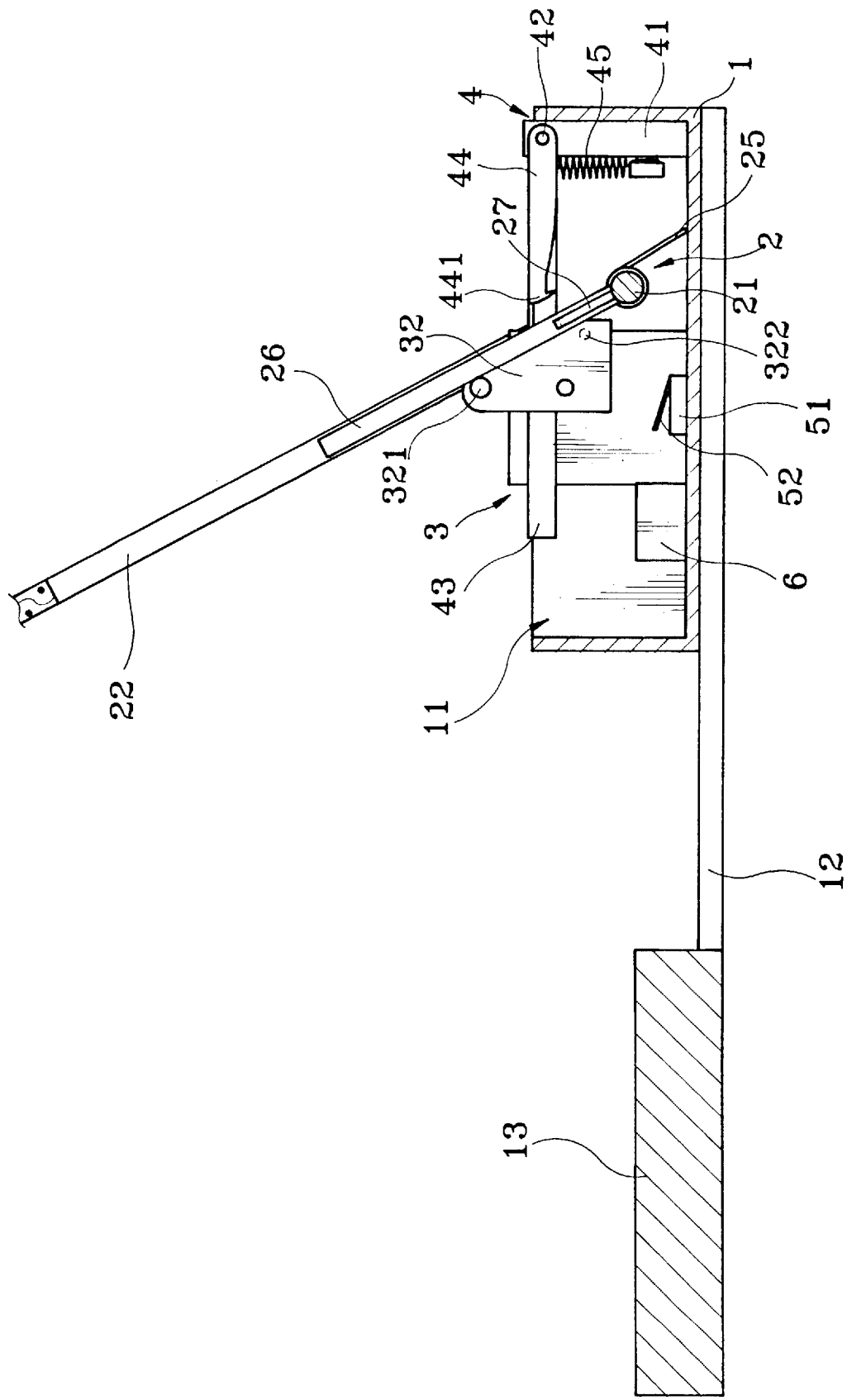
FIG. 3C is similar to FIG. 3A but showing the flyflap lifted (Step II)

Referring to FIG. 3A and FIGS. 1 and 2 again, the casing 1 comprises a chamber 11 which receives the flapping mechanism 2, the driving mechanism 3, the holding-down mechanism 4, the intermittent action control device 5 and the stop device 6, an extension bottom frame 12 disposed at the bottom and defining a trapping area 13 outside the chamber 11. The flapping mechanism 2 comprises an actuating rod 21 having two opposite ends respectively extended through two opposite lateral sides of the casing 1 each through a respective through hole (not shown) therein, a meshed flyflap 23 having two parallel arms 22 respectively and fixedly connected to the two opposite ends of the actuating rod 21 outside the casing 1, two spring elements, for example, torsional springs 24, 25 respectively mounted around the actuating rod 21 to impart a downward pressure to the arms 22 of the meshed flyflap 23, a driven rod 26 perpendicularly extended from the periphery of the actuating rod 21 and driven by the driving mechanism 3, and a lug 27 perpendicularly raised from the periphery of the actuating rod 21 and held down by the holding-down mechanism 4. The driving mechanism 3 is comprised of a motor 31, and a driven member 32. The driven member 32 has a first projecting rod 321 at one side adapted for moving the driven rod 26 of the flapping mechanism 2, and a second projecting rod 322 at an opposite side adapted for moving the holding-down mechanism 4. The holding-down mechanism 4 comprises a mounting block 41 fixedly fastened to the casing 1 inside the chamber 11, a long pressure rod 43 and a short pressure rod 44 bilaterally pivoted to the mounting block 41 by a pivot shaft 42, and a spring element 45 connected between the long pressure rod 43 and the mounting block 41. The short pressure rod 44 has a hooked portion 441 adapted for hooking on the lug 27 of the actuating rod 21. The intermittent action control device 5 is comprised of a timer, and a power control switch 51 disposed below the driven member 32 of the driving mechanism 3. Through the timer, the motor 31 can be automatically controlled to turn the flapping mechanism 2 at the desired time interval. The stop device is mounted inside the chamber 11 of the casing 1 to limit the down stroke of the arms 22 of the flyflap 23 of the flapping mechanism 2.

Figure 3D:
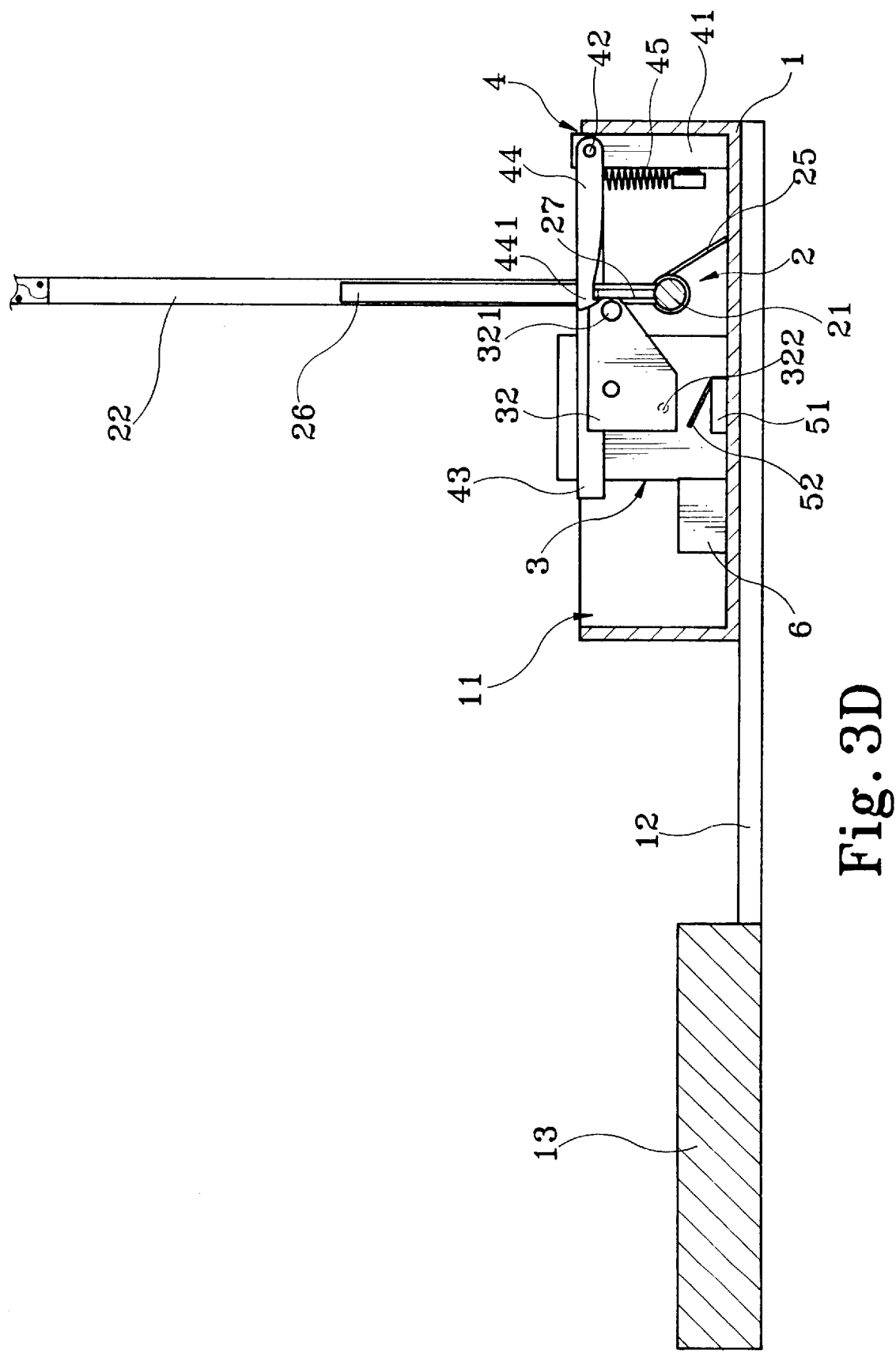
FIG. 3D is similar to FIG. 3A but showing the flyflap lifted (Step III).

The operation of the flytrap is described hereinafter with reference to FIGS. from 3A to 3D. When in use, a bait is placed on the trapping area 13. When the power supply is turned on, the motor 31 of the driving mechanism 3 is started to turn the driven member 32, causing the driven member 32 to be moved away from the springy switching lever 52 of the power control switch 51. When the driven member 32 is turned by the motor 31, the first projecting rod 321 is moved to lift the driven rod 26, thereby causing the actuating rod 21 to be turned. When the actuating rod 21 is turned, the arms 22 of the flyflap 23 are lifted. At the same time, the second projecting rod 322 is moved to lift the long pressure rod 43. When the long pressure rod 43 is lifted, the short pressure rod 44 is synchronously lifted (see FIG. 3B). When the driven rod 26 is lifted to a certain height, hooked portion 441 of the short pressure rod 44 is forced to hook on the lug 27 of the actuating rod 21 (see FIG. 3D). When the hooked portion 441 of the short pressure rod 44 is hooked on the lug 27 of the actuating rod 21, the driven member 32 is continuously moved. When the driven member 32 is moved back and pressed on the springy switching lever 52 of the power control switch 51 again (see FIG. 3A), power supply is immediately cut off from the motor 31. When power supply is off, the intermittent action control device 5 starts counting time. When a predetermined length of time (for example, two minutes) is up, the driving mechanism 3 is started again to repeat the actions from FIGS. 3B to 3D, causing the driven member 32 to be moved away from the springy switching lever 52 of the power control switch 51. This length of time can be set by the user through a timer 53 of the intermittent action control device 5. When the driven member 32 is moved away from the springy switching lever 52 of the power control switch 51 at a certain distance, the second projecting rod 322 of the driven member 32 is forced to move the long pressure rod 43 of the holding-down mechanism 4, thereby causing the short pressure rod 44 to be turned away from the lug 27 of the actuating rod 21 (see FIG. 3B). When the short pressure rod 44 is disengaged from the lug 27 of the actuating rod 21, the spring elements 24, 25 are released from the constraint, therefore the arms 22 of the flyflap 23 are forced downward by the spring force of the spring elements 24, 25, causing the flyflap 23 to flap the trapping area 13.

I claim:

1. A flytrap comprising:

a casing defining a receiving chamber and a trapping area outside said receiving chamber for holding a bait for attracting flies;

a driving mechanism mounted in the receiving chamber;

a flapping mechanism controlled to swat flies attracted by said bait, said flapping mechanism comprising an actuating rod mounted in said receiving chamber of said casing and turned by the driving mechanism and having two opposite ends extended out of said receiving chamber, and a flyflap having two arms respectively connected to the two opposite ends of said actuating rod;

the driving mechanism mounted in the receiving chamber of said casing and controlled to turn said actuating rod through a driven member thereof;

a holding-down mechanism, said holding-down mechanism comprising a mounting block fixedly fastened to said casing inside said receiving chamber, a first pressure rod pressing on a part of said driven member, a second pressure rod pressing on a part of said flapping mechanism and synchronously turned with said first pressure rod; and an intermittent action control device mounted in the receiving chamber of said casing at one side of said driving mechanism and having a power control switch disposed below said driven member;

wherein when said driving mechanism is started, the driven member of said driving mechanism, is turned to move said flapping mechanism and said holding-down mechanism, causing said holding-down mechanism to hold down said flapping mechanism, and then continuously turned to press said power control switch, causing the power control switch to cut off power supply from said driving mechanism, and at the same time causing said intermittent action control device to count a predetermined length of time, causing said driving mechanism to be started again to turn said driven member when the predetermined length of time is up, so that said driven member is moved to release said holding-down mechanism from said flapping mechanism, enabling said flapping mechanism to swat attracted flies in said trapping area.

2. The flytrap of claim 1 wherein said flapping mechanism comprises a spring means mounted around said actuating rod to impart a downward pressure to the arms of said flyflap.

3. The flytrap of claim 1 wherein said flapping mechanism further comprises a driven rod fixedly connected to said actuating rod and adapted to be moved by the driven member of said driving mechanism.

4. The flytrap of claim 3 wherein said driven member of said driving mechanism comprises a first projecting rod adapted for moving the driven rod of said flapping mechanism, and a second projecting rod adapted for moving the first pressure rod of said holding-down mechanism.

5. The flytrap of claim 1 wherein said driving mechanism comprises a motor controlled to turn said driven member.

6. The flytrap of claim 1 wherein said intermittent action control device comprises a means for setting said predetermined length of time.

7. The flytrap of claim 1 wherein the second pressure rod of said holding-down mechanism has a hooked portion adapted for hooking on a lug at the periphery of said actuating rod of said flapping mechanism.

8. The flytrap of claim 1 further comprising a stop device mounted inside said casing to limit the down stroke of said flyflap of said flapping mechanism.

9. The flytrap of claim 1 wherein said flyflap of said flapping mechanism is a meshed flap.

10. The flytrap of claim 1 wherein said power control switch of said intermittent action control device is a micro switch.

11. The flytrap of claim 1 wherein said first pressure rod and said second pressure rod of said holding-down mechanism are respectively pivoted to two opposite ends of a pivot in said mounting block.

12. The flytrap of claim 1 wherein said holding-down mechanism further comprises a spring element connected between said mounting block and said first pressure rod.

\* \* \* \* \*